з,468,763
Patented Sept. 23, 1969

3,468,763
PURIFICATION OF TEREPHTHALONITRILE BY AZEOTROPIC DISTILLATION WITH ETHYLENE GLYCOL
Joseph Pugach, Bronx, N.Y., assignor to Halcon International, Inc., a corporation of Delaware
No Drawing. Filed June 21, 1966, Ser. No. 559,103
Int. Cl. B01d 3/36, 3/10, 9/02
U.S. Cl. 203—48                          4 Claims

ABSTRACT OF THE DISCLOSURE

A process for purifying terephthalonitrile by distilling a mixture comprising terephthalonitrile and ethylene glycol, and separating said nitrile from said glycol.

---

The present invention relates to terephthalonitrile and, more particularly, it relates to an improved method for purifying terephthalonitrile.

Terephthalonitrile as commercially obtained by the ammoxidation of para-xylene has a purity of about 80% and is contaminated with para-methylbenzonitrile and higher boiling materials. This crude terephthalonitrile is purified by flash distillation at atmospheric pressure followed by a fractional distillation also at atmospheric pressure. This process is long and laborious as terephthalonitrile boils at 285° C.

It is an object of the present invention to provide an improved method for purifying terephthalonitrile. Another object is to provide a method for purifying terephthalonitrile at lower temperatures. A further object is to provide a faster process for purifying terephthalonitrile. These and other objects of the present invention will become apparent from the following description.

It has now been found that terephthalonitrile forms an azeotrope with ethylene glycol, and that highly purified terephthalonitrile may be prepared in a very simple manner by distilling the azeotrope. This azeotrope of terephthalonitrile and ethylene glycol boils at about 190° C. Pure terephthalonitrile may be obtained by forming a solution containing from about 1 to about 20 parts by weight, preferably from about 3 parts to about 6 parts by weight, of ethylene glycol to 1 part by weight of crude terephthalonitrile. Such mixtures may be distilled at temperatures considerably below the boiling point of terephthalonitrile. Upon cooling the azeotropic distillate, the terephthalonitrile solidifies and is readily separable from the liquid ethylene glycol.

The distillation may take place under vacuum at pressures of from 0.01 mm. up to about atmospheric, preferably from about 300 mm. to about 760 mm. The temperature is dependent upon the pressure. At atmospheric pressure the distillation temperature will be from about 190° C. to about 205° C. At pressures below atmospheric, the temperature will be correspondingly lower. Preferably, the distillation is carried out under an inert atmosphere, such as for example, nitrogen or carbon dioxide.

The following example illustrates the present invention.

Example

A mixture containing 100 grams of crude terephthalonitrile, obtained by the ammoxidation of para-xylene and having a purity of about 80%, and 300 grams of ethylene glycol is heated under a nitrogen atmosphere at atmospheric pressure in a 500 ml. 3-necked flask equipped with a distilling head, air cooled condenser and a receiving flask. At reflux the head temperature rises to 190° C., and an azeotropic mixture of ethylene glycol and terephthalonitrile begins to distill over. Material is taken overhead until the head temperature rises to 205° C. at which point the distillation is stopped. The distillate weighs 270 grams. White crystals of terephthalonitrile are formed in the distillate on cooling to room temperature. The crystals are filtered and washed free of residual ethylene glycol with water and dried. The amount of terephthalonitrile obtained is 70 grams indicating a yield of about 88% with respect to the total terephthalonitrile in the starting mixture. The uncorrected melting point of the terephthalonitrile is 224.5–225° C. Upon admixing a sample of this terephthalonitrile with an equal quantity of terephthalonitrile which has been purified by conventional distillation, there is no melting point depression.

What is claimed is:
1. A proces for purifying terephthalonitrile which comprises distilling a mixture containing 1 part by weight of crude terephthalonitrile obtained by the ammoxidation of para-xylene and 1 part to 20 parts by weight of ethylene glycol at pressures of from 0.01 mm. to atmospheric, cooling the distillate, and separating terephthalonitrile from the distillate.
2. A process according to claim 1 which contains from 3 parts to 6 parts by weight of ethylene glycol to 1 part by weight of terephthalonitrile, and wherein terephthalonitrile is separated by cooling and filtering the distillate.
3. A process according to claim 1 wherein the mixture contains from 3 parts to 6 parts by weight of ethylene glycol to 1 part of terephthalonitrile, and wherein the distillation is conducted at pressures of from 300 mm. to atmospheric.
4. A process according to claim 3 wherein terephthalonitrile is separated by cooling and filtering the distillate.

References Cited

UNITED STATES PATENTS

| 2,664,435 | 12/1953 | Burton et al. | 203—64 X |
| 3,070,519 | 12/1962 | Lotz | 203—64 X |
| 3,362,982 | 1/1968 | Oga et al. | 203—64 X |

FOREIGN PATENTS 551,364  10/1956  Belgium.

OTHER REFERENCES

Allerhand et al., Journal of the American Chemical Society, volume 85, number 7, pp. 866–870.
Weissberger, Technique of Organic Chemistry, volume IV, Distillation, pp. 359–368, 1951.

CHARLES B. PARKER, Primary Examiner
S. T. LAWRENCE III, Assistant Examiner

U.S. Cl. X.R.
203—64, 91; 260—465